US007979434B2

(12) United States Patent
Rothschild

(10) Patent No.: US 7,979,434 B2
(45) Date of Patent: Jul. 12, 2011

(54) SYSTEM AND METHOD FOR STORING AND RETRIEVING DIGITAL CONTENT WITH PHYSICAL FILE SYSTEMS

(75) Inventor: Leigh M. Rothschild, Sunny Isles Beach, FL (US)

(73) Assignee: LMR Inventions, Bay Harbour Island, FL (US)

( * ) Notice: Subject to any disclaimer, the term of this patent is extended or adjusted under 35 U.S.C. 154(b) by 458 days.

(21) Appl. No.: 12/156,519

(22) Filed: Jun. 2, 2008

(65) Prior Publication Data

US 2009/0300025 A1    Dec. 3, 2009

(51) Int. Cl.
G06F 7/00 (2006.01)
G06F 17/30 (2006.01)
(52) U.S. Cl. ......... 707/736; 707/770; 707/795; 707/796
(58) Field of Classification Search .................. 707/706, 707/736, 770, 795, 796
See application file for complete search history.

(56) References Cited

U.S. PATENT DOCUMENTS

| 6,366,683 | B1* | 4/2002 | Langlotz ................ 382/128 |
| 2003/0088831 | A1* | 5/2003 | Bauer et al. ................ 715/516 |
| 2004/0215597 | A1* | 10/2004 | Fitzgerald et al. ........... 707/1 |
| 2006/0025670 | A1* | 2/2006 | Kim et al. ................ 600/407 |
| 2006/0259773 | A1* | 11/2006 | Jung et al. ................ 713/176 |
| 2008/0320377 | A1* | 12/2008 | Seetharamakrishnan et al. ................ 715/200 |
| 2009/0054768 | A1* | 2/2009 | Halmann et al. ............ 600/437 |

* cited by examiner

*Primary Examiner* — John Breene
*Assistant Examiner* — Phong Nguyen

(57) ABSTRACT

A system and method for retrieving and storing digital documents with physical file storage systems are provided. The disclosed system and methods allow a user to retrieve digital documents from a conventional file storage system and to seamlessly categorize and store the digital documents within the conventional file storage system. The system and method provide for receiving an identifier associated with the physical file folder; and accessing the digital documents of the physical file folder using the received identifier. The system and method further provide for storing digital content in a file folder over a network including uploading and storing the digital content; entering an identification code associated with at least one file folder; and assigning digital content to the at least one selected file folder.

28 Claims, 4 Drawing Sheets

SYSTEM AND METHOD FOR STORING AND RETRIEVING DIGITAL CONTENT WITH PHYSICAL FILE SYSTEMS

BACKGROUND

1. Field

The present disclosure relates generally to data processing and communication systems, more particularly, to a system and a method of seamlessly linking, categorizing and storing paper documents originating from a physical file folder in digital form, eliminating the paper documents, and storing and retrieving digital documents from a conventional file storage system.

2. Description of Related Art

Billions of paper documents originating from digital files are printed and filed each year. Most of these documents originate in some sort of digital form, such as a word processing document, a scanned document or an email. However, upon retrieval, they are not easily available or available at all in their original digital form or, if they are, they are not easily found if found at all.

The goal of any business, government organization, or any other type of organization is to reduce paper and to transform paper documents originating from digital file documents to digital documents that are easily categorized and located.

At the current time, many paper documents that originate from digital documents are printed, stored and/or filed in conventional file cabinets or storage systems. One of the reasons for the above system is to provide a convenient way to store and organize these paper documents for retrieval at a later time. However, once the paper documents, which sometimes originate from digital form, are retrieved they are not easily linked back to the original digital files from which they were created.

Therefore, a need exists for a system and a method of storing and retrieving paperless digital files in a conventional file storage system without printing out the paper documents. A need also exists for a method to allow multiple users to be able to access the same digital file and, therefore to allow multiple parties access to information in the digital file, and the digital file themselves, e.g. for editing, reviewing, etc.

SUMMARY

A system and method for retrieving and storing digital documents with physical file storage systems are provided. The disclosed system and method allow a user to retrieve digital documents from a conventional physical file storage system and to seamlessly categorize and store the digital documents within the conventional physical file storage system.

A system for retrieving and storing digital documents from a physical file folder over a network is provided including at least one terminal configured for retrieving at least one digital document from a physical file folder associated with an identifier; a remote server configured for reading the identifier and retrieving the at least one digital document from a digital storage medium representing the physical file folder; and a communications network for coupling the at least one terminal and the remote server.

A method for retrieving and storing a digital document in a physical file over a network is provided. The method comprises receiving an identifier associated with the physical file folder; and accessing at least one digital documents of the physical file folder using the received identifier.

A method of storing digital content in a file folder over a network is also disclosed, including uploading and storing the digital content; entering an identification code associated with at least one file folder; and assigning digital content to the at least one selected file folder.

BRIEF DESCRIPTION OF THE DRAWINGS

The above and other aspects, features, and advantages of the disclosure will become more apparent in the light of the following detailed description when taken in conjunction with the accompanying drawings in which.

DETAILED DESCRIPTION

Figure 1:
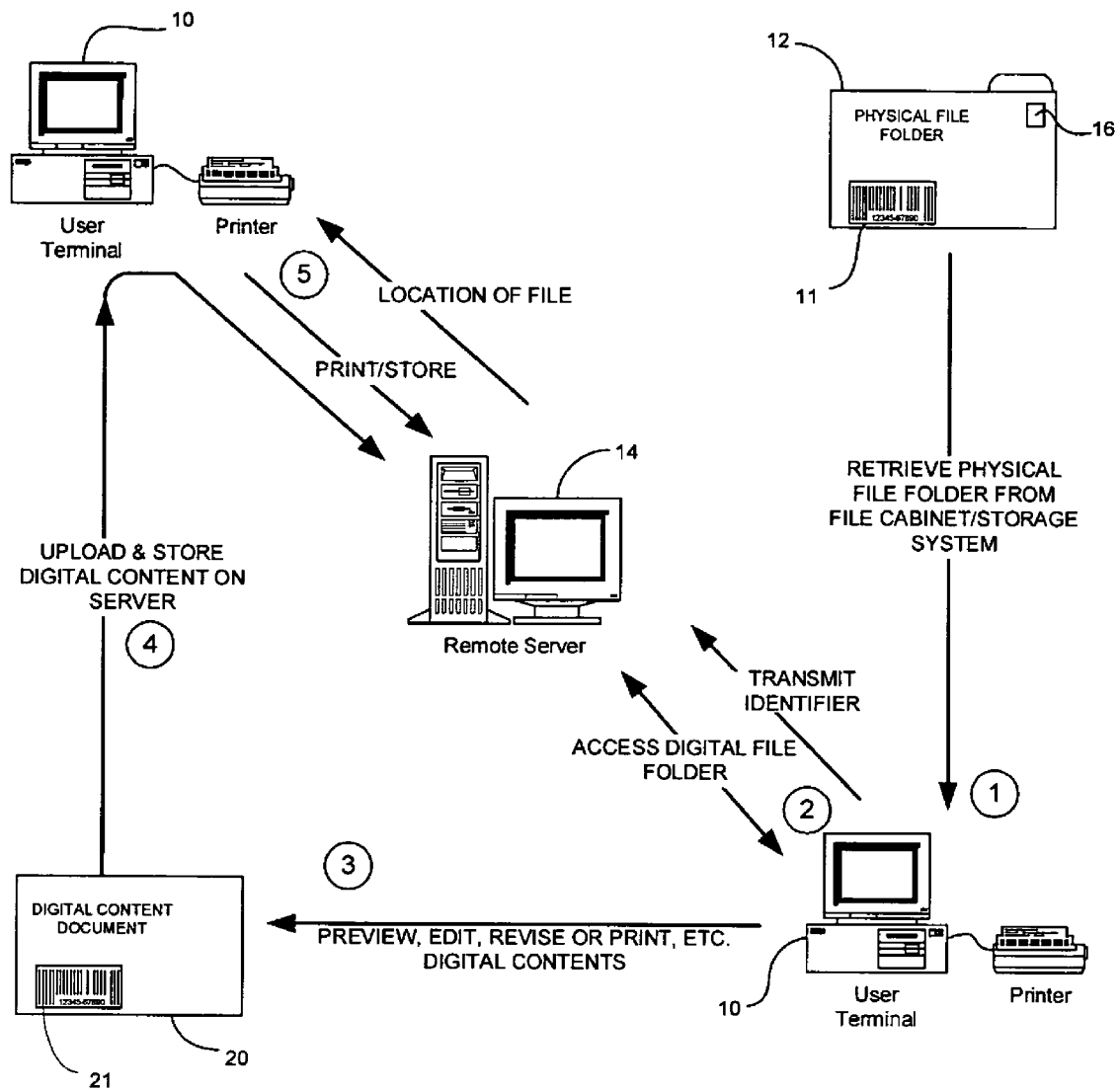
FIG. 1 is an overall flow diagram of a system and method for retrieving and storing paperless digital file folders in a conventional file storage system.

Preferred embodiments of the disclosure will be described hereinbelow with reference to the accompanying drawings. In the following description, well-know functions or constructions are not described in detail to avoid obscuring the disclosure.

A system and method for retrieving and storing digital documents with physical file storage systems are provided. The disclosed system and method allow a user to retrieve digital documents from a conventional file storage system and to seamlessly categorize and store the digital documents within the conventional file storage system.

Digital documents refer to any type of digital content, such as documents drafted using any composition program herein known or known in the future including, but not limited to, Microsoft Word™, Google Docs, Corel's WordPerfect™, Adobe Photoshop™ or Creative Suite™ or Acrobat™, Microsoft Excel™, Lotus SmartSuite™, etc., or other digital content such as, e-mails, web pages, web links, invoices, brochures, court papers, scanned documents, etc.

In an embodiment of the disclosure, a method for retrieving digital documents from a conventional file cabinet/storage system is disclosed. In this embodiment, a user or multiple users decide to retrieve digital documents from a physical file folder located in a conventional file cabinet/storage system. The user accesses the physical file folder in a conventional file cabinet/storage that contains no paper files. The user takes the physical file folder to their user terminal/workstation and, upon inquiry from the terminal/workstation, the computer gives a list of all the digital documents contained within the file folder. A second user may also decide to retrieve digital documents from the physical file folder located in the conventional file cabinet/storage system. The second user also takes the file folder to his or her terminal/workstation to view the digital documents contained within the file folder. However, the second user will be locked out from accessing digital documents that are being accessed by others. For example, when viewing the list of documents associated to the physical file folder, the second or subsequent user will be presented with a list indicating which documents are currently being accessed by other users. Subsequent users will be locked out from accessing these documents until the first user saves or stores the document or otherwise not accessing the document.

The users may sort the digital documents by date, by subject, by title, by category, by author, or any other defined search criteria. Further, the user(s), if they have security access, may access the digital documents on his or her computer or terminal screen. Given the user(s) has the requisite security access, the user(s) may edit the digital documents or may print the digital documents of the file folder. The user(s) can then reply to the digital documents, if needed, or perform any routine processing of any type on the digital documents as he or she would as if the digital documents of the file folder had existed in paper form.

In another embodiment of the disclosure, a system and method for storing digital documents in a physical file folder located in a conventional file cabinet/storage system is provided. In this embodiment of the disclosure, a user desires to store a digital document that they have created, modified and/or edited on their computer or terminal in a file folder. The user can view which digital documents, pending requisite security access, are contained in each file folder. Viewing the digital documents in one or more file folders may include viewing individual digital documents in every file (to determine contents of a particular file), seeing a preview of the digital documents of a requested file folder and/or viewing the entire digital contents of one or more requested file folders. Once the user determines which file folder he decides to store the digital document in, the user specifies to the user terminal/workstation an identification code of the file folder. The user directs the user terminal/workstation to digitally 'print/store' the user's digital document in that file folder. In one embodiment, for the 'store' function, the user's computer transmits the identification code of the file folder to a remote or local database along with the digital document so that the digital document is stored on a digital storage medium in association with the proper physical file folder. The digital document may also have a digital document identification code and name that will also be stored in the database. Furthermore, in certain embodiments, for the 'print' function, the digital document will be printed at the user's terminal or at a printer associated with a server of the network wherein the printed digital document can be filed in the physical file folder at a later time. In a totally "paperless environment", the print function will not cause the document to be printed out but merely stored in association with the file folder. In one embodiment, the user is given the location of the conventional file cabinet/storage system once he specifies the chosen file folder for the digital documents, e.g., the file folder is in the file cabinet located in the conference room or simply the file folder is located in file cabinet number one.

In another embodiment of the disclosure, a method for viewing the digital documents via a portable viewer from the physical file folder within a conventional file cabinet/storage system is provided. The user directs the user terminal/workstation to send the digital documents via Bluetooth™, Wi-Fi, Universal Serial Bus (USB™) cable, infrared, or any other data transmission system now known or later known to the designated viewer. Exemplary standalone dedicated viewers currently exist including, but not limited to, the Sony Ereader and the IRex Iliad, Readius, GeR2 by Ganaxa, Kindle by Amazon.com, and Hanlin eReader by Jinke. Other portable readers include various tablet computers such as the Toshiba™ and Hewlett Packard™ Tablet computers. In a preferred embodiment, the reader also contains a computer processor and a communications port (such as via Bluetooth™, Wi-Fi, Universal Serial Bus (USB™) cable, infrared, or any other data transmission system now known or later known) then the user can use this device to recognize the identifier of the file folder in the conventional file cabinet/storage system. Once the identifier of the physical file folder is read by a device containing a communications port and a processor, the user can view the digital documents of the file folder on a display included in the device.

Referring to FIG. 1, an overall flow diagram of a system and method for retrieving and storing paperless digital files in a conventional storage system is illustrated. Physical file folder 12 is located in a traditional conventional file cabinet/storage system. Initially, if a user determines that they require file folder 12, they retrieve physical file folder 12 from the conventional file cabinet/storage system (Step 1). File folder 12 may be a traditional file folder that allows for storage of paper documents (some or all derived from digital files), or file folder 12 may contain a file placard that does not allow for storage of any paper documents. In one embodiment, file folder 12 may contain an electronic screen display, digital memory and a computer processor. In this embodiment, the electronic screen display will present to the user all the information on the contents of the file folder and file folder 12 will be devoid of paper files. Alternatively, the screen display may be incorporated in the physical file folder. The display could be in the form of an liquid crystal display device or even in the form of electronic paper such as the Xerox™ epaper. A further exemplary display device is an electrophoretic display which is an information display that forms visible images by rearranging charged pigment particles using an applied electric field. Examples of commercial electrophoretic displays include the high-resolution active matrix displays used in the Amazon Kindle, Sony Librie, Sony Reader, and iRex iLiad e-readers. These displays are constructed from an electrophoretic imaging film manufactured by E Ink Corporation. It is to be appreciated other types of currently used or to be developed display devices may be incorporated into the physical file folder for displaying the contents of the physical file folder to the user.

File folder 12 contains identifier 11, which identifies the subject matter of the file folder 12. Identifier 11 may be the name of file folder, the number convention that the files are identified by, etc. It is to be appreciated identifier 11 may be placed on the file folder 12 itself or it may be placed on a tab. Identifier 11 (a printed tab or handwritten tab) may be directly affixed onto file folder 12 or placard. In one embodiment, identifier 11 includes a bar code or an alpha-numeric string. If identifier 11 for file folder 12 is handwritten or printed without a barcode, the entry into user terminal 10 is manual. A manual entry could include any method now known or developed in the future including, but not limited to, using a keyboard, voice recognition software, etc. If the printed identifier has a bar code, the code may be scanned via a scanner coupled to the user terminal 10.

In another embodiment, the file folder 12 also includes an electronic identification tag 16. There are various types of electronic identification tags known in the art including, but not limited to, Radio Frequency Identification Device (RFID) tags, electric identification, and transponders of various types and any other type of device that can receive, store and transmit information. The tag 16 will includes an identification code indicating the associated physical file folder. The tag 16 will wirelessly transmit the identification code to the user terminal 10 when the file folder is within a predetermined distance of the user terminal 10.

Generally, once the user retrieves the physical file folder 12 from the conventional file cabinet/storage system, the remote server 14 will request the identifier or identification code affixed to the file folder 12. The identifier or identification code identifies the location of the digital documents of file folder 12 on remote server 14. Identification code will include a unique code transmitted from the electronic identification tag and/or any other type of device that can receive, store and transmit information to a reader/receiver coupled to user terminal 10 or to a computer on the user's computer network. User's computer terminal 10 or computer network will retransmit identification code to the global communication network (the Internet) (discussed in detail below), a local area network (LAN), or a wide area network (WAN) that will identify file folder 12. It is to be appreciated that the identifier and identification code will be used in an interchangeable manner throughout the disclosure and either the identifier or identification code can be sent to the server for determining the file folder.

Identifier or identification code 11 is then submitted to the database storing file folder 12 situated either locally or remotely (Step 2). In either case, using standard database software, the database will resolve identifier or identification code 11 and determine where digital documents 20 of file folder 12 are located. The user may then request retrieval of digital documents 20 of file folder 12 to user terminal 10. The information provided by file folder 12 includes what digital documents have been stored in file folder 12 and where digital documents 20 in file folder 12 are located, e.g. in remote digital storage 14 or in local digital storage.

In one embodiment, digital documents 20 of file folder 12 will be stored on the remote server 14 or local server 10 along with a user identifier, e.g., the user's name or other code relating to the identity of the user, and identification code 11 in a database. The user can then access original file folder 12 as stored on remote server 14 via the user's terminal 10. Once connected to remote server 14, the user will enter the user's identifier and identifier or identification code 11 to gain access to digital documents 20 of file folder 12. The user's identifier operates as, among others, an identifier to identify to others who has the digital file, it operates to allow or disallow previewing of digital documents 20 depending on the user's security access, etc. Once connected to remote server 14, the user will enter user's identifier to gain access to digital documents 20 of file folder 12. The user then has access to full file folder 12 or partial file 12 depending on the security access of the user.

Once the user has access to file folder 12, they may have access to any of digital documents 20 on the computer display of the user terminal 10 (if the user has security access to these documents/contents). Further, digital documents 20 can be sorted by subject, title, by category, by author, or by any other useful, defined criteria. In this manner, the user can perform editing on digital documents 20 (documents, spreadsheets, etc.), print out any of digital documents 20, or perform any routine processing, as the user would be able to do had file folder 12 existed in paper form.

In another embodiment, a second user terminal (not shown) may access file folder 12 at the same time as user terminal 10. The second user may also take file folder 12 to the second user terminal (not shown) and obtain the same information as stated above. However, the second user will be presented with a list of documents indicating which documents are in use by other users. The second user will be locked out from accessing these documents. In this manner, the system and method of the present disclosure ensures only one user can access and edit a digital document at one time, thereby eliminating the possibility of users overwriting each others work.

Referring to the storage aspect of FIG. 1, a user 10, e.g., a user of a digital file folder, previews, edits, revises and/or composes and stores digital document 20 on a Local Area Network (LAN), a Wide Area Network (WAN) or the global computer network, e.g., the Internet. A user previews, edits, revises and/or composes digital document 20 (Step 3). It is to be appreciated that digital document 20 can be a new digital document or a revised document that was accessed and now is different than the original. Digital document 20 is then uploaded from the user terminal 10 to the remote server 14 (Step 4). Alternatively, the user, can compose, review, edit and revise the document on the remote server 14 and save digital document 20 on remote server 14 using remote server's 14 computer processing power.

In Step 5 of FIG. 1, once digital document 20 is saved on the remote server 14 database, the user will choose a file folder 12 with assigned identification code 11 for digital document 20 (document, etc.). The user may choose same file folder 12 from which digital document 20 (document, etc.) was retrieved or choose another file folder in which to save digital document 20. Remote server 14 will then assign document identification code 21 for each digital document 20. Each document 20 will also have its own name identifier and identification code 21. In one embodiment, identification code 21 will be an alpha-numeric string consisting of at least nine digits and presented in the form of an area code phone number. A sample code would be A9C-RT1-09HG. This alpha-numeric code would allow remote server 14 to assign more then a thousand trillion identification codes. Remote server 14 will assign these numbers at random so that no documents fall in a number sequence, to prevent guessing code sequences and 'hacking' into the documents database. Document identification code 21 once assigned may be converted to any form of symbology currently know including barcodes such as UPC, EAN, PDF417, etc., photosymbols, standard or specialized text, etc., or any future type of symbology. Once assigned the alpha-numeric string or symbology representing the alpha string will be printed onto the document as either a visible watermark, a digital watermark, or both, such that the recipient or viewer of the document can easily read the symbology or that a machine (e.g., a scanner or other type of device) can read the identification code. It is to be appreciated that, in certain embodiments, the file folder identifier and document identification code can be used to create a single symbology and/or alpha-numeric code which will simplify entry of this information and simplify the retrieval of this single document from a file folder at a later time.

The user will then receive via download or other form of communication between remote server 14 and user's terminal 10 digital document 20 with identification code 21 affixed. Digital document 20 can then be printed by the user with identification code 21 and/or stored into a file folder of the user's choice. The user may request information on what digital documents each digital file folder contains by requesting the information using the file folder's identifier or identification code 11. Once identified file folder 12 is selected, the user's local computer or a computer associated with the user's computer (such as a computer hooked to a network) will then transmit to a remote database, such as the global communications network, the Internet, or a local database, identification code 11 of file folder 12 that the digital document has been stored/filed in. The name and location of the digital document will also be stored in the database using the document identification code 21. This information will remain in the remote or local database until it is deleted or modified. The remote server 14 will return the physical file location of the file folder to the user.

The disclosure contemplates the use of any known or to be developed document composition programs such as Microsoft Word™, Google Docs, Corel WordPerfect™, Adobe Photoshop™, and other programs. The present disclosure also contemplates adding a plug-in control to a user's software applications residing on a local terminal (whether the plug-in is supplied by the software publisher or supplied by a third party provider). The plug-in control will allow the documents that are created with these various composition programs on the local terminal to be stored, data based, and the symbology/alpha-numeric strings added to the final document without the user having to manually upload and download the digital document to the remote server. The plug-in control will seamlessly interact with the remote server and cause an identification code to be generated and the final version of the digital document to be stored on the remote server in addition to being stored on the local terminal. Once loaded at a local terminal, the plug-in may appear as a button in a toolbar of the document composition program or may appear as an additional and separate toolbar. In this manner, after the digital document has been created, edited, and/or revised in any manner, the user will simply select, or click on, the appropriate button or toolbar with a cursor control device and the local terminal will interact with the remote server and an identification code will be generated for the digital document as described herein. It is to be appreciated that other software applications, e.g., an applet, may reside on the local terminal, which will perform the same functionality as the plug-in.

Figure 2:
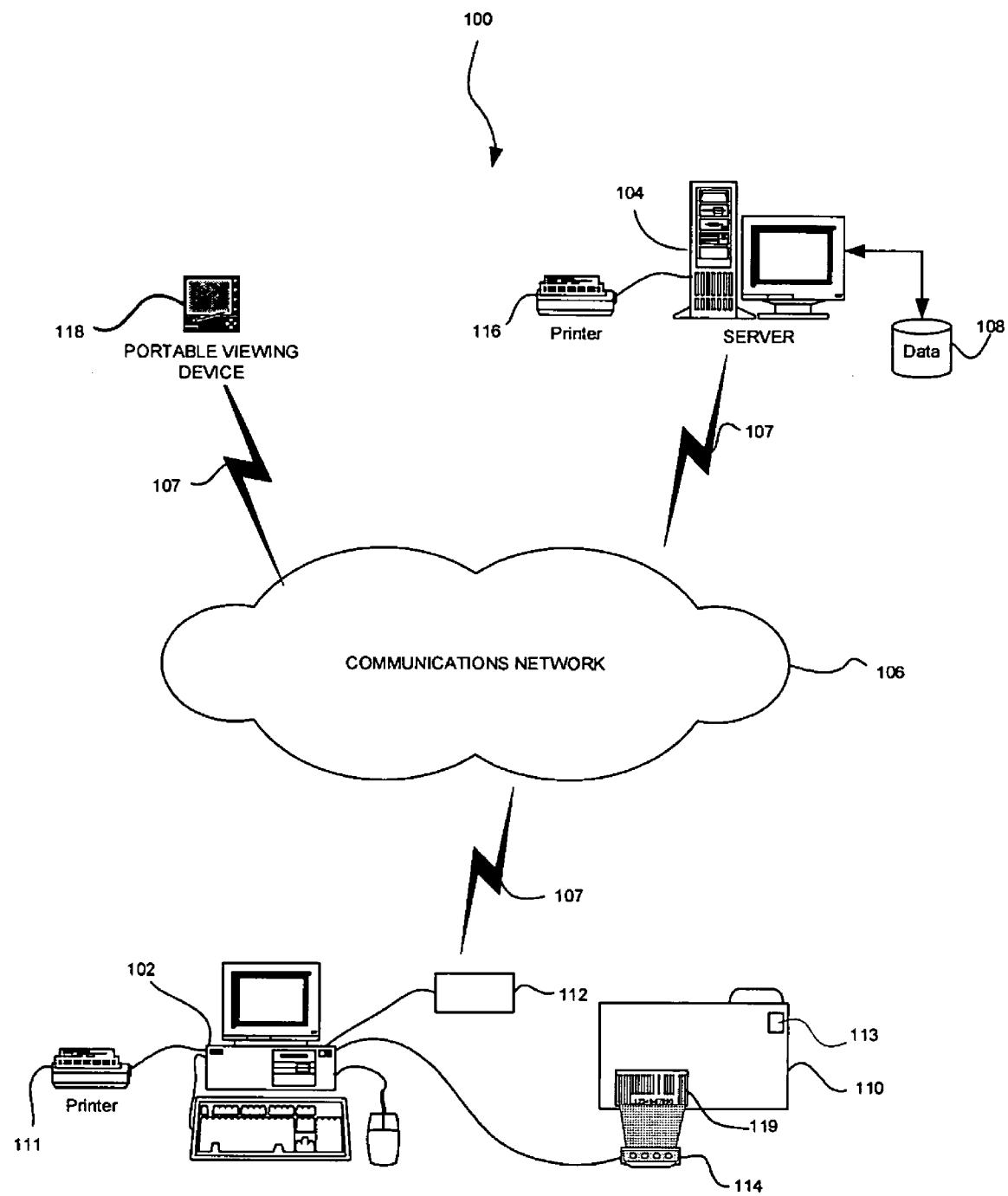
FIG. 2 is a diagram of a system for linking paperless digital file folders over a network in accordance with an embodiment of the present disclosure.

Referring to FIG. 2 a diagram of a system for linking paperless digital files over a network is illustrated. System 100 includes a terminal 102, e.g., a user computer, for accessing server 104 over communications network 106, e.g., the Internet. Terminal 102 and server 104 will communicate using any conventional architecture, for example a client/server architecture where terminal 102 will execute a client application, e.g., a web browser, to access an application executing on server 104. Terminal 102 will access server 104 to enable a user to transmit identification code 119 for file folder 110. Server 104 will receive identification code 119 affixed to file folder 110. Identification code 119 identifies the location of digital content of file folder 110 on remote server 104. In one embodiment, scanner 114 will read the identifier from the file folder and determine the identification code. In another embodiment, identification tag 113 will transmit a unique code to an electronic identification tag and/or any other type of device that can receive, store, and transmit information to a reader/receiver coupled to terminal 102 on user's server/network 102 so that the user can preview, review, edit, print, etc. portions of the digital documents of the or file folder 110 itself and possibly forward the digital document to a second user terminal (not shown). Terminal 102 will include communication module 112 for communicating to remote server 104.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine, e.g., terminal 102 or server 104, comprising any suitable architecture such as a personal computer, a workstation or server. Preferably, the machine is implemented on a computer platform having hardware such as one or more central processing units (CPU), a random access memory (RAM), a read only memory (ROM) and input/output (I/O) interface(s) such as a keyboard, cursor control device (e.g., a mouse or joystick) and display device. A system bus couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system.

In addition, various other peripheral devices may be connected to the computer platform of the machine by various interfaces and bus structures, such a parallel port, serial port or universal serial bus (USB). One such peripheral device may include a communications device, e.g., a modem, satellite relay, wireless connection, etc., for enabling communications from terminal 102 to various servers. Other peripheral devices may include additional storage devices, printer 111 and scanner 114.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Terminal 102 and/or server 104 may operate in a networked environment using logical connections to one or more remote computers. The remote computer may be a personal computer, a server, a router, a network PC, a peer device or other common network node, and typically includes many or all of the elements described above relative to the machine. It is to be appreciated that network 106 may be a local area network (LAN), wide area network (WAN), the Internet or any known network that couples a plurality of computers to enable various modes of communication via network messages. Terminal 102 may communicate to the server 104 and network 106 via any known communication link 107, for example, dial-up, hardwired, cable, DSL, satellite, cellular, PCS, wireless transmission (e.g., 802.11a/b/g, etc.), etc. Furthermore, the devices will communicate using the various known protocols such as Transmission Control Protocol/Internet Protocol (TCP/IP), File Transfer Protocol (FTP), Hypertext Transfer Protocol (HTTP), etc. During a purchasing transaction, the computing devices may employ Hypertext Transfer Protocol Secure (HTTPs), Secure Sockets Layer (SSL) Protocol, Secure Electronic Transaction (SEC) Protocol, etc.

Figure 3:
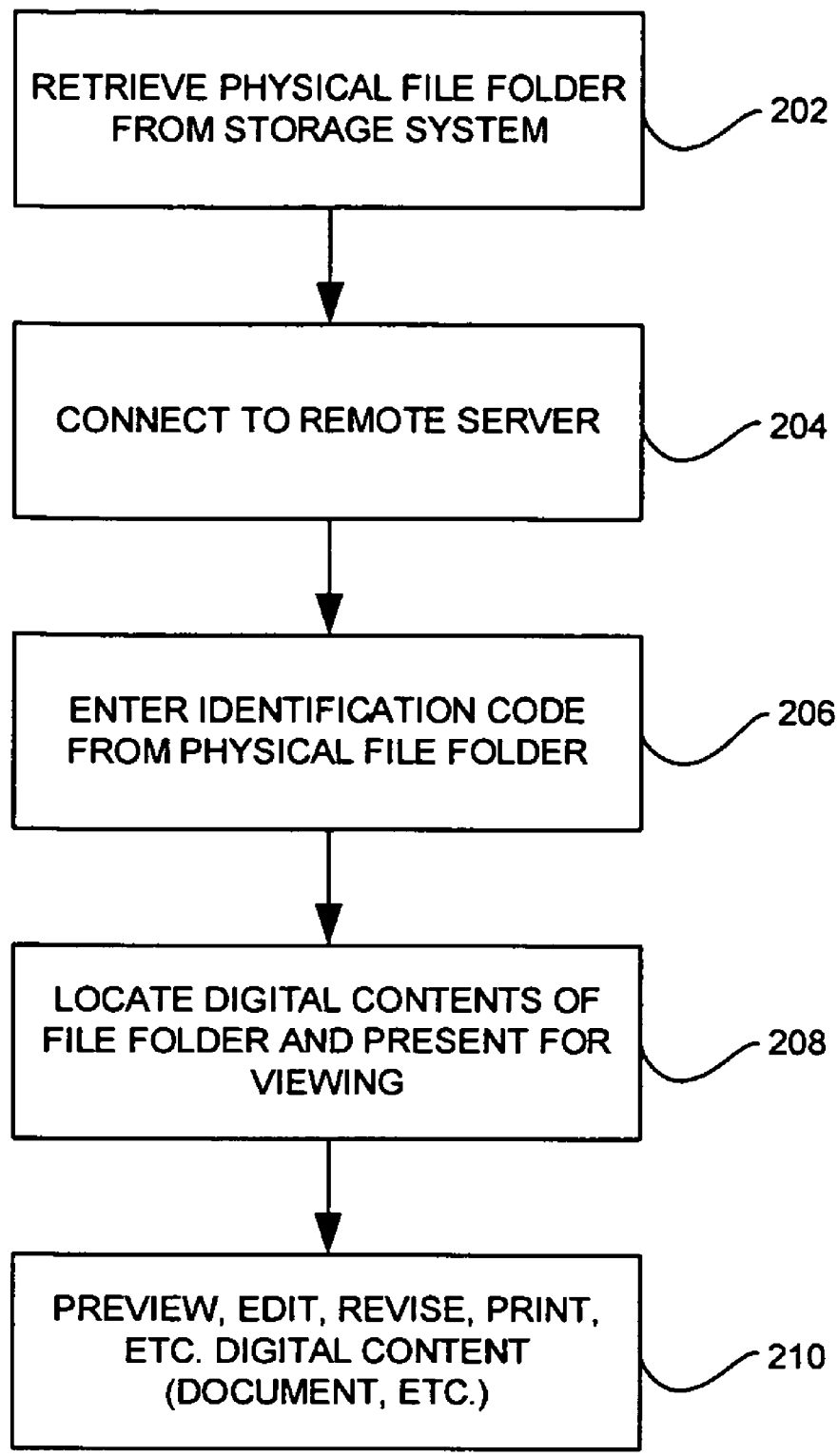
FIG. 3 is a flow chart illustrating a method for retrieving a digital document or file of a physical file folder in accordance with an embodiment of the disclosure.
Figure 4:
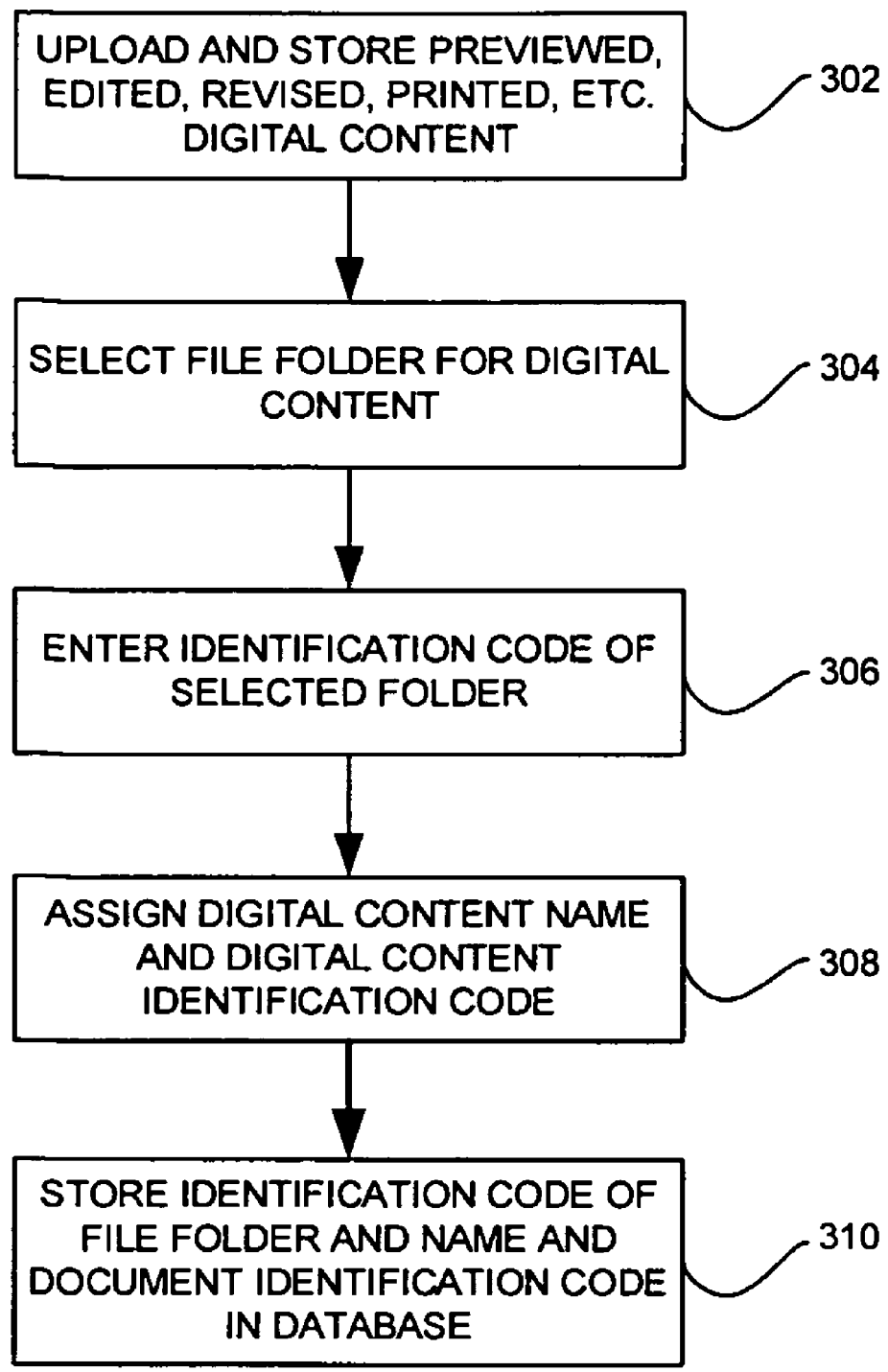
FIG. 4 is a flow chart illustrating a method of storing a digital document in a physical file folder in accordance with an embodiment of the disclosure.

Referring to FIG. 2-4, a system and a method for retrieving and storing documents from a conventional file cabinet, storage system to a digital system are described. FIG. 3 is a flow chart illustrating a method for retrieving digital documents from a conventional file cabinet/storage system. FIG. 4 is a method of storing the digital documents in a file folder.

Initially, once the physical and digital file folder have been created and stored, the physical file folder is retrieved from the storage system and/or file cabinet in step 202. The user will retrieve the physical file folder 110 (step 202) and connect to a remote site residing on remote server 104 (step 204). In step 206, the recipient enters identifier 119 from file folder. The recipient may enter the information manually via the keyboard, voice recognition, etc. or by scanning identifier 119 via scanning device 114. Identifier 119 may be the file folder name or any other identifier.

Alternatively, once the user retrieves the physical file folder 110 from the conventional file cabinet/storage system, the terminal 102 will read identification tag 113 affixed to file folder 110 at step 206. Identification tag 113 identifies the location of the digital document of file folder 110 on remote server 104. Identification code 113 will transmit a unique code to a reader/receiver coupled to user terminal 102 or to a computer on the user's computer network.

Once entered, identification code or identifier will cause the remote server 104 to access standard database software including Microsoft Access™, Oracle™ Software, etc., and using standard computer processing power, locate the requested document and then allow the user to view the digital documents of file folder 110 on his local terminal 102 (step 208). Once accessed, the digital documents of file folder 110 may be sorted by content, document category, document name, recipient's name, document date, or any other user defined parameters. In step 210, if the user has the granted security access, the user may preview, edit, revise, print, etc. the digital documents accessed.

In one embodiment of the present disclosure, the user may also indicate the user's account login and password and then the remote server will locate all documents that are associated with the user's identity. If the user accesses their account, the subject document, i.e., the newly received document, will then be added into the database of the user's stored and accessible documents.

Referring to FIG. 4, initially, a user previews, edits, revises, and/or prints, etc. digital documents on the global computer network, e.g., the Internet. The user will preview, edit, revise and/or print, etc the digital documents on local terminal 102. The document is then uploaded from local terminal 102 to remote server 104, in step 302. Alternatively, the user can preview, edit, revise, and/or print, etc. the digital documents on remote server 104 and save the document on remote server 104 using remote server's 104 computer processing power. Any other notations regarding digital document such as how to file the document (for example, by category, subject matter, identification code, etc.) can also be communicated to remote server 104. All of the information on the document will be stored in a standard database program such as Oracle's Database™, Microsoft Access™, etc. using standard database storage protocols on storage medium 108.

In another embodiment, the user will also indicate the user's identity (e.g., the user's e-mail address or any other unique identification) so that the remote server knows the identity of the originator of the document, i.e., the user of the digital document. Any other notations regarding digital document 20 such as how to file digital document 20 (for example, by category, subject matter, file number, etc.) can also be communicated to remote server 104. Identification code 119 will be used in conjunction with an identifier of the user as the login/password set for future access to an edited or final product digital document (document, etc), in a case where one user has final review of the digital document 20 of a digital file folder. The user identifier such as the user's name on digital document 20 is used as the login entry. This identifier will be something that is obvious to all users of the digital documents 110, except in the case of a 'secure' document where the user will inform server 104 not to specify login information.

In another embodiment of the present disclosure, the user can also indicate an addressee of the digital document, e.g., an intended recipient, by entering the addressee's name, residence address, e-mail address and/or fax number. While entering the addressee's information, the user can also indicate that the addressee should be sent a preview of the digital document by e-mail or fax.

Once the previewed, edited, revised and/or printed, etc., the digital document is saved on remote server database 108, the user will select file folder 110 to store the digital document (step 304). When a digital document is stored, the user instructs local terminal 102 or remote terminal 104 database 108 the identification code 119 of file folder 110 that the user decides to store the digital document within. The user may request information on all relevant file folders using identification code 119 as described in detail above. Once file folder 110 is selected, user terminal 102 or a computer associated with user terminal 102, such as a computer hooked to a network, will then transmit to the global communications network 106 identification code 119 of file folder 110 that the digital document is filed in (step 306).

After the digital document is saved on remote server database 108, the server 104 will assign a name and document identification code to the document, in step 308. The remote server 104 will then assign an document identification code for this individual document. Each document will have its own document identification code. In one embodiment, the document identification code will be an alpha-numeric string consisting of at least nine digits and presented in the form of an area code phone number. A sample code would be A9C-RT1-09HG. This alpha-numeric code would allow the remote server 104 to assign more then a thousand trillion identification codes. The remote server 104 will assign these numbers at random so that no documents fall in a number sequence, to prevent guessing code sequences and 'hacking' into the documents database. Document identification code once assigned may be converted to any form of symbology currently know including barcodes such as UPC, EAN, PDF417, etc., photo-symbols, standard or specialized text, etc., or any future type of symbology. Once assigned the alpha-numeric string or symbology representing the alpha string will be printed onto the document either as a visible watermark, a digital watermark, or both, such that the recipient of the document can easily read the symbology or that a machine (e.g., a scanner or other type of device) can read document identification code.

The user will then receive via download or other form of communication between remote server 104 and user's terminal 102 digital document 20 with identification code 21 affixed. Digital document 20 can then be printed by the user with identification code 21 and/or stored into a file folder of the user's choice. The user may request information on what digital documents 20 each digital file folder contains by requesting the information using the file folder's identification code 16. Once identified file folder 110 is selected, the user's local computer or a computer associated with the user's computer (such as a computer hooked to a network) will then transmit to a remote database, such as the global communications network, the Internet, or a local database, identification code of file folder 110 that the digital document has been stored/filed in. The name and location of the digital document will also be stored in the database using the document identification code 21. Once file folder 12 has been selected, user terminal 10 or a computer associated with user terminal 10 will transmit to a remote or a local data base identification code 16 of file folder 12 that digital document 20 has been filed within. The name, document identification code and location of digital document 20 will be stored in the remote or local database until it is deleted or modified.

In step 310, the user stores digital document via user terminal 102 with a file folder 110 identification code 119, digital document name and document identification code. If the user is creating the document on the remote server 104, the server 104 can store and print the document via printer 116.

In another embodiment of the disclosure, a method for storing digital document 20 via a portable viewer 118 from physical file folder 110 within a conventional file cabinet/storage system is disclosed. The user retrieves the physical file folder 12 from the conventional file cabinet/storage system and the user terminal 102 will read identifier 119 or identification code 113 affixed to the file folder 110. Identifier or Identification code identifies the location of the digital document 20 of file folder 110 on remote server 104. A list of documents in the file folder is then presented to the user. The user will then specify the IP address or any other identifier of the location of the mobile device 118 to the server. The local or remote server will then transmit the requested digital file contents to the mobile device 118 using known or future communication protocols including via Bluetooth™, Wi-Fi, Universal Serial Bus (USB™) cable, infrared, or any other data transmission system now known or later known to the designated viewer.

In a preferred embodiment, the mobile stand-alone device 118 also contains a computer processor and a communications port, such as via Bluetooth™, Wi-Fi, Universal Serial Bus (USB™) cable, infrared, or any other data transmission system now known or later known to the designated viewer. Then the user can use the mobile stand-alone device 118 to recognize identifier 119 or identification code 113 of the file folder in the conventional file cabinet/storage system. In one embodiment, the portable reader device 118 includes a reader for reading the identifier 119 associated with the physical file folder. The reader for reading the identifier includes but is not limited to a barcode scanner, a imaging device (such as a CCD encoding device), an electronic tag reader or any other known or to be developed device for reading and decoding an identifier or symbology located on the physical file folder. Once electronic identification code of the physical file folder 110 is read by a device 118 containing a communications port, a processor and a display screen, so that one device can both request, receive, display, process and store the digital documents 20 of the digital file folder on the display included in the device. In this embodiment, the user may request, using standard computer processing power, digital document 20 in the file to be sorted by date, by subject, by title, by category, by author, or by any other user defined search criteria. As discussed in great detail above, the user can use the mobile stand-alone device to store digital documents 20 as the user would from a user terminal.

While this disclosure has been shown and described with reference to certain preferred embodiments thereof, it will be understood by those skilled in the art that various changes in form and detail may be made therein without departing from the spirit and scope of disclosure of the appended claims.

What is claimed is:

1. A method implemented by a server for retrieving and storing digital documents over a network, the method comprising:
 receiving over the network digital documents associated with a physical file folder, the digital documents originally being created using a document composition program;
 assigning a document identification code to each of the digital documents;
 receiving over the network an identifier associated with the physical file folder;
 accessing the digital documents associated with the physical file folder using the received identifier;
 presenting a list of the digital documents to a first user;
 enabling the user to access and edit at least one digital document of the presented list; and
 saving the at least one accessed and edited digital document;
 wherein the document composition program enables the user to edit the at least one digital document of the presented list and includes a plug-in for transmitting the edited at least one digital document from a user terminal to the server; and
 wherein the identifier comprises information identifying the subject matter of the digital documents associated with the physical file folder and information identifying the location of the digital documents in a database.

2. The method as in claim 1, wherein the identifier is a symbology or alpha-numeric string located on the physical file folder.

3. The method as in claim 1, wherein the step of receiving the identifier includes wirelessly receiving, at a local computer, the identifier from a tag located on the physical file folder and transmitting the identifier to the server.

4. The method as in claim 3, wherein the tag is a radio frequency identification tag.

5. The method as in claim 1, wherein the physical file folder is a placard including the identifier in printed form.

6. The method as in claim 1, further comprising:
 enabling the first user to preview at least one accessed digital document; and
 enabling the first user to review, edit, email, publish, or print the at least one accessed digital document through a user terminal.

7. The method as in claim 6, wherein the at least one accessed digital document is locked out from being accessed by a second sequent user while being accessed by the first user.

8. The method as in claim 1, wherein the presenting step further comprises indicating to the first user which of the digital documents are in use by other users.

9. The method as in claim 1, further comprising creating a watermark on each digital document, each watermark representing the respective document identification code.

10. The method as in claim 1, further comprising creating a single symbology containing the identifier and the document identification code.

11. The method as in claim 1, further comprising:
 enabling the first user to preview at least one accessed digital document; and
 enabling the first user to email the at least one accessed digital document through a user terminal to a second user.

12. A system for retrieving and storing digital documents over a network comprising:
 a user terminal configured for transmitting an identifier from a physical file folder associated with digital documents;
 a server configured for receiving the identifier, retrieving the digital documents associated with the physical file folder from a database and transmitting to the user terminal a list of the digital documents;
 a communications network for coupling the user terminal and the server;
 the user terminal configured for enabling a user to access and edit at least one digital document of the list and saving the at least one accessed and edited digital document to the server, wherein the server assigns a document identification code to the at least one accessed and edited digital document;

the user terminal includes a software application for editing the at least one digital document, wherein the software application includes a plug-in for transmitting the edited at least one digital document to the server; and wherein the identifier comprises information identifying the subject matter of the digital documents associated with the physical file folder and information identifying the location of the digital documents in the database.

13. The system as in claim 12, wherein the user terminal includes a scanning device for reading the identifier from the physical file folder.

14. The system as in claim 12, wherein the user terminal includes a reader for wirelessly receiving the identifier from an electronic tag located on the physical file folder.

15. The system as in claim 14, wherein the electronic tag is a radio frequency identification tag.

16. The system as in claim 12, wherein the identifier is a symbology or alpha-numeric string located on the physical file folder.

17. The system as in claim 12, wherein the physical file folder is a placard including the identifier in printed form.

18. The system as in claim 12, wherein the physical file folder includes an electronic paper display for presenting the list of digital documents to a user.

19. The system as in claim 12, wherein the user terminal further comprises a portable reader device for enabling a user to view accessed digital documents, wherein the terminal transmits an address for the portable reader device to the server with the identifier and the server transmits the list of digital documents to the portable reader device.

20. The system as in claim 19, wherein the portable reader device includes a reader for reading the identifier associated with the physical file folder.

21. The system as in claim 20, wherein the reader for reading the identifier includes a barcode scanner, an imaging device or an electronic tag reader.

22. The system as in claim 12, further comprising a physical file cabinet configured to store the physical file folder when not in use.

23. The system as in claim 12, wherein the digital documents are new digital documents or revised digital documents.

24. A computer-implemented method of storing digital content associated with a physical file folder, the computer-implemented method comprising:

creating digital content using a document composition program executing on a user terminal;

uploading the digital content to a server for storage in a database;

entering an identification code associated with a physical file folder;

assigning the digital content to the physical file folder;

enabling a user to access and edit the digital content;

saving the accessed and edited digital content; and wherein the document composition program enables the user to edit the digital content and includes a plug-in for transmitting the edited digital content from a user terminal to the server; and wherein the identification code comprises information identifying the location of the digital content in the database.

25. The computer-implemented method as in claim 24, further comprising printing the digital content and disposing the printed digital content in the physical file folder.

26. The computer-implemented method as in claim 24, wherein the document composition program includes a single function for transmitting the created digital content to the server and printing the created digital content.

27. The computer-implemented method as in claim 24, further comprising entering a user identifier for identifying a user to gain access to the digital content.

28. The computer-implemented method as in claim 27, wherein the user identifier indicates to other users the user who is accessing the digital content.

\* \* \* \* \*